G. W. B. STOY.
Slaughtering Elevator.
No. 23,124.
Patented March 1, 1859.
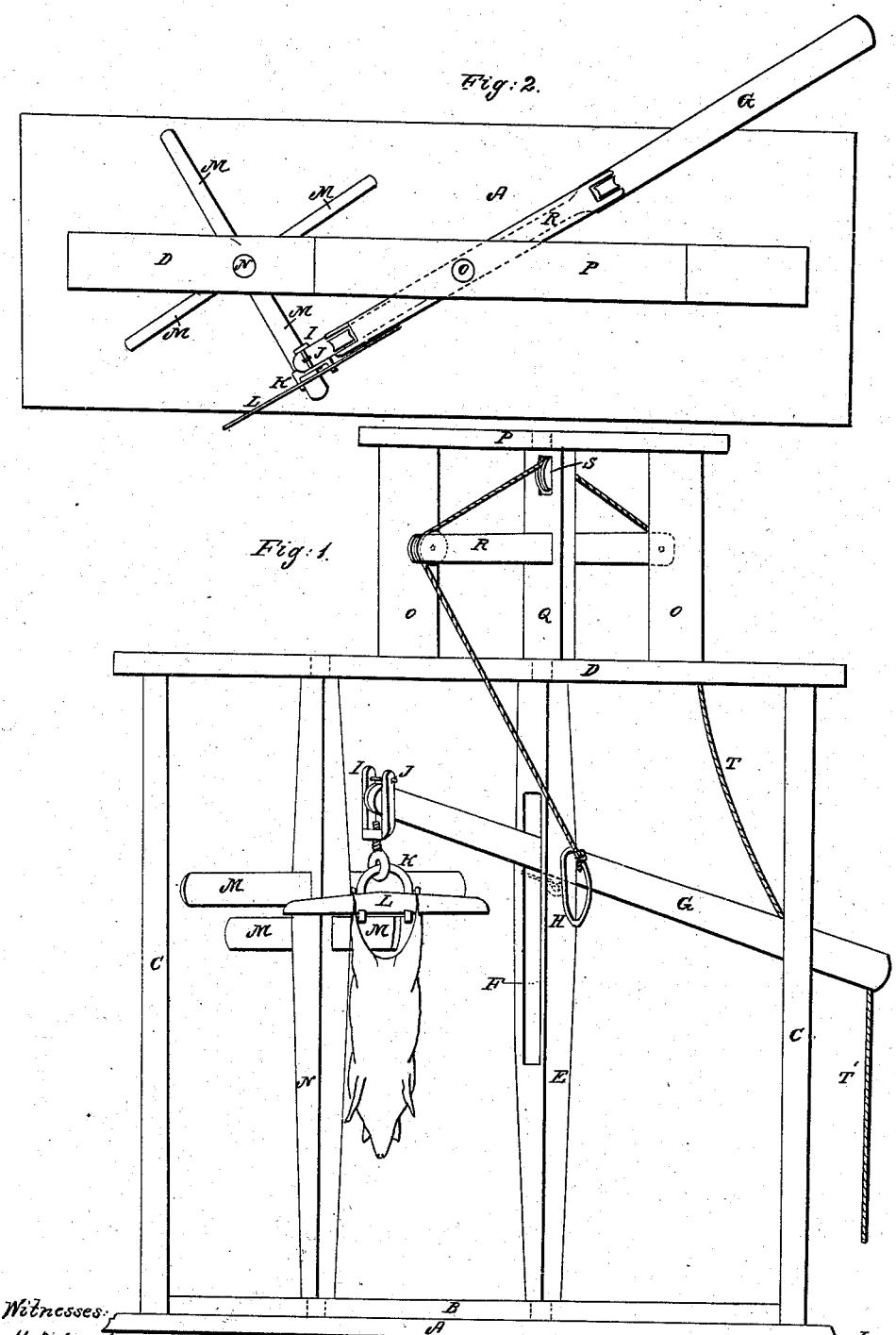

UNITED STATES PATENT OFFICE.

G. W. B. STOY, OF CARLISLE, PENNSYLVANIA.

APPARATUS FOR SLAUGHTERING HOGS.

Specification of Letters Patent No. 23,124, dated March 1, 1859.

*To all whom it may concern:*

Be it known that I, G. W. B. STOY, of Carlisle, in the county of Cumberland and State of Pennsylvania, have invented a new and useful Apparatus for Elevating and Transferring Hogs and other Animals in Slaughtering; and I do hereby declare that the same is described and represented in the following specification and drawings.

To enable others skilled in the art to make and use my invention I will proceed to describe its construction and operation referring to the drawings in which the same letters indicate like parts in each of the figures.

Figure 1 is an elevation of my apparatus, and Fig. 2 is a plan or top view.

The nature of my invention consists in the arrangement hereinafter described.

In the accompanying drawings A, is a base supporting the rectangular frame consisting of the bottom bar B, posts C, C, and top bar D, which are fastened together so as to form a strong frame, which is fastened to the base A, to hold it upright. The bars B, and D, are perforated for the pivots of the upright shaft E, which is arranged to turn freely. The pivots are shown by dotted lines in Fig. 1. The shaft E, has a long mortise F, through it for the lever G, to vibrate in on the pin H, to which it is fastened as shown by dotted lines in the drawing. The clevis I, is fastened to the lever G, by the staple J, and carries the double hook K, which may be hooked under the gambrel L, applied to the hog or animal being slaughtered by pulling down the end of the lever to which the clevis is fastened, then by depressing the opposite end of the lever the hog is raised, and by moving the lever the hog is carried from the slaughtering bench, and the gambrel L, placed across one of the arms M, of the rotating shaft N, so as to hang the hog ready for washing and gutting. The pivots of the shaft N, are arranged to turn in the bars B, and D, and the shaft is mortised and the arms M, inserted to hang the hogs or other animals slaughtered on, and by turning the shaft N, the arms M, may each be brought in succession opposite the hook on the lever G to hang the animals slaughtered as described.

To enable a boy to use my apparatus with facility, I fasten the posts O, O, in the bar D, and apply the top bar P, to them and perforate it for the upper end of the shaft Q, to turn in, the lower end of said shaft being coupled to the pivot of the shaft E, so as to be turned by and with the shaft E, and carry the bar R, fastened in the shaft Q, which bar R, is provided with a pulley in each end; and there is also a pulley S, in the upper part of the shaft Q. The rope T, is fastened to the long end of the lever G, and passes over each of the abovementioned pulleys and the end fastened in some convenient position so as to be readily reached by the boy who operates the apparatus to enable him to raise the long end of the lever G, with one hand, while he places the hook K, under the gambrel with the other hand. Then by pulling the rope T', which hangs below the lever he can raise the hog from the slaughtering bench and hang it on one of the arms M of the rotating shaft N.

With this apparatus a boy ten or twelve years old can raise carry and hang a hog with ease and facility, that would require two of the strongest men to do by taking the hog in their arms. Besides in the large slaughtering establishments, it is very difficult to get men to lift carry and hang hogs, as they are so liable to injure themselves either by straining their muscles or by bursting a blood vessel, which has frequently been done. Hence it is apparent my apparatus saves a great deal of dangerous labor of the most costly kind.

I believe I have described the apparatus which I have invented, for carrying raising and hanging hogs and other animals, so as to enable those skilled in the art to make and use it. I will now state what I desire to secure by Letters Patent viz:

I claim—

The arrangement of the vertical shaft E, Q, lever G, and bar R with the vertical rotating shaft N, and the rectangular frames B, C, D, and O, P, the whole being constructed as and for the purpose herein set forth.

G. W. B. STOY.

Witnesses:
LEML. TODD,
STEPHEN KEEPERS.